(12) United States Patent
Johnson et al.

(10) Patent No.: US 10,530,823 B2
(45) Date of Patent: Jan. 7, 2020

(54) NETWORK STREAM PROCESSING TO ENSURING A GUARANTEE THAT EACH RECORD IS ACCOUNTED FOR EXACTLY ONCE

(71) Applicant: AT&T Intellectual Property I, L.P., Atlanta, GA (US)

(72) Inventors: Theodore Johnson, New York, NY (US); Vladislav Shkapenyuk, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 335 days.

(21) Appl. No.: 15/232,847

(22) Filed: Aug. 10, 2016

(65) Prior Publication Data

US 2018/0048689 A1      Feb. 15, 2018

(51) Int. Cl.
| | | |
|---|---|---|
| H04L 29/06 | (2006.01) |
| G06F 16/2455 | (2019.01) |
| H04M 15/00 | (2006.01) |
| H04L 12/713 | (2013.01) |
| H04L 12/931 | (2013.01) |
| G06F 9/52 | (2006.01) |
| G06F 16/16 | (2019.01) |
| G06F 9/38 | (2018.01) |

(52) U.S. Cl.
CPC ........ *H04L 65/60* (2013.01); *G06F 16/24568* (2019.01); *H04M 15/41* (2013.01); *H04M 15/70* (2013.01); *H04M 15/73* (2013.01); *G06F 9/3824* (2013.01); *G06F 9/52* (2013.01); *G06F 16/164* (2019.01); *H04L 45/586* (2013.01); *H04L 49/70* (2013.01)

(58) Field of Classification Search
CPC .......................... G06F 17/30516; H04L 67/10
See application file for complete search history.

(56) References Cited

U.S. PATENT DOCUMENTS

| | | | | |
|---|---|---|---|---|
| 5,978,831 | A  * | 11/1999 | Ahamed | G06F 9/52 |
| | | | | 712/30 |
| 7,480,660 | B1 * | 1/2009 | Black | H04L 67/02 |
| 8,572,331 | B2 | 10/2013 | Butterworth et al. | |
| 8,578,379 | B2 | 11/2013 | Berg et al. | |
| 8,762,965 | B2 | 6/2014 | Alpern et al. | |
| 9,274,863 | B1 | 3/2016 | Qiu et al. | |
| 9,276,959 | B2 | 3/2016 | Theimer et al. | |

(Continued)

OTHER PUBLICATIONS

Babu, Yasvanth "Docker Container Cluster Deployment Across Different Networks". Dated Jan. 2016, pp. 1-61.

(Continued)

*Primary Examiner* — Barbara B Anyan

(57) ABSTRACT

A method, computer-readable medium, and device for processing a stream of records with a guarantee that each record is accounted for exactly once are disclosed. A method may receive, via a first operator, a data stream having a plurality of records, the plurality of records provided by a plurality of first data sources; allocate the data stream to a plurality of shards of the first operator; process the plurality of records by each shard of the plurality of shards to generate a first output stream, where each shard being implemented with at least two replicas; and output the first output stream to a third operator or a subscriber.

20 Claims, 5 Drawing Sheets

(56) References Cited

U.S. PATENT DOCUMENTS

| | | | |
|---|---|---|---|
| 2004/0006741 A1* | 1/2004 | Radja | G06F 17/2247 |
| | | | 715/236 |
| 2005/0034014 A1 | 2/2005 | Moser et al. | |
| 2006/0242461 A1* | 10/2006 | Kondo | G06F 9/3824 |
| | | | 714/21 |
| 2007/0179646 A1* | 8/2007 | Dempski | G06Q 10/10 |
| | | | 700/83 |
| 2008/0065635 A1* | 3/2008 | Farber | G06F 16/164 |
| 2008/0155310 A1 | 6/2008 | Langen et al. | |
| 2012/0078951 A1* | 3/2012 | Hsu | G06F 16/24568 |
| | | | 707/769 |
| 2013/0290249 A1 | 10/2013 | Merriman et al. | |
| 2014/0304505 A1 | 10/2014 | Dawson | |
| 2015/0124622 A1 | 5/2015 | Kovvali et al. | |
| 2015/0124820 A1 | 5/2015 | Alizadeh Attar et al. | |
| 2015/0310044 A1 | 10/2015 | Isaacson et al. | |
| 2015/0363245 A1 | 12/2015 | Mutschler | |
| 2016/0094366 A1 | 3/2016 | Wang et al. | |
| 2016/0127975 A1 | 5/2016 | Hu et al. | |
| 2016/0203174 A1 | 7/2016 | Shahane et al. | |
| 2016/0204977 A1 | 7/2016 | Cui et al. | |
| 2017/0083585 A1 | 3/2017 | Chen et al. | |
| 2017/0237686 A1 | 8/2017 | Wang | |

OTHER PUBLICATIONS

Suh, Dongeun "On Performance of Open Daylight Clustering", Dated 2016, pp. 1-4.

* cited by examiner

NETWORK STREAM PROCESSING TO ENSURING A GUARANTEE THAT EACH RECORD IS ACCOUNTED FOR EXACTLY ONCE

The present disclosure relates generally to methods, computer-readable media and devices for processing a stream of records with a guarantee that each record is accounted for exactly once.

BACKGROUND

Data streaming systems are used to perform real-time analysis and recording of flows of data records. Many data streaming systems are best-effort systems, which may drop records whenever they are under overload conditions. Similarly, there may be instances where data streaming systems may experience an unexpected failure of a data source where it may be difficult to ascertain as to what records have already been processed from the failed data source given the sudden interruption. As such, it is possible that the data streaming systems may simply end up processing the same records multiple times, i.e., "over accounting" of the records. Although dropping some records or over accounting the same records multiple times may be acceptable for some applications, other applications will require a guarantee that each and every record is accounted for and processed only once.

SUMMARY

In one example, the present disclosure discloses a method, computer-readable medium, and device for processing a stream of records with a guarantee that each record is accounted for exactly once. A method may receive, via a first operator, a data stream having a plurality of records, the plurality of records provided by a plurality of first data sources; allocate the data stream to a plurality of shards of the first operator; process the plurality of records by each shard of the plurality of shards to generate a first output stream, where each shard being implemented with at least two replicas; and output the first output stream to a third operator or a subscriber.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
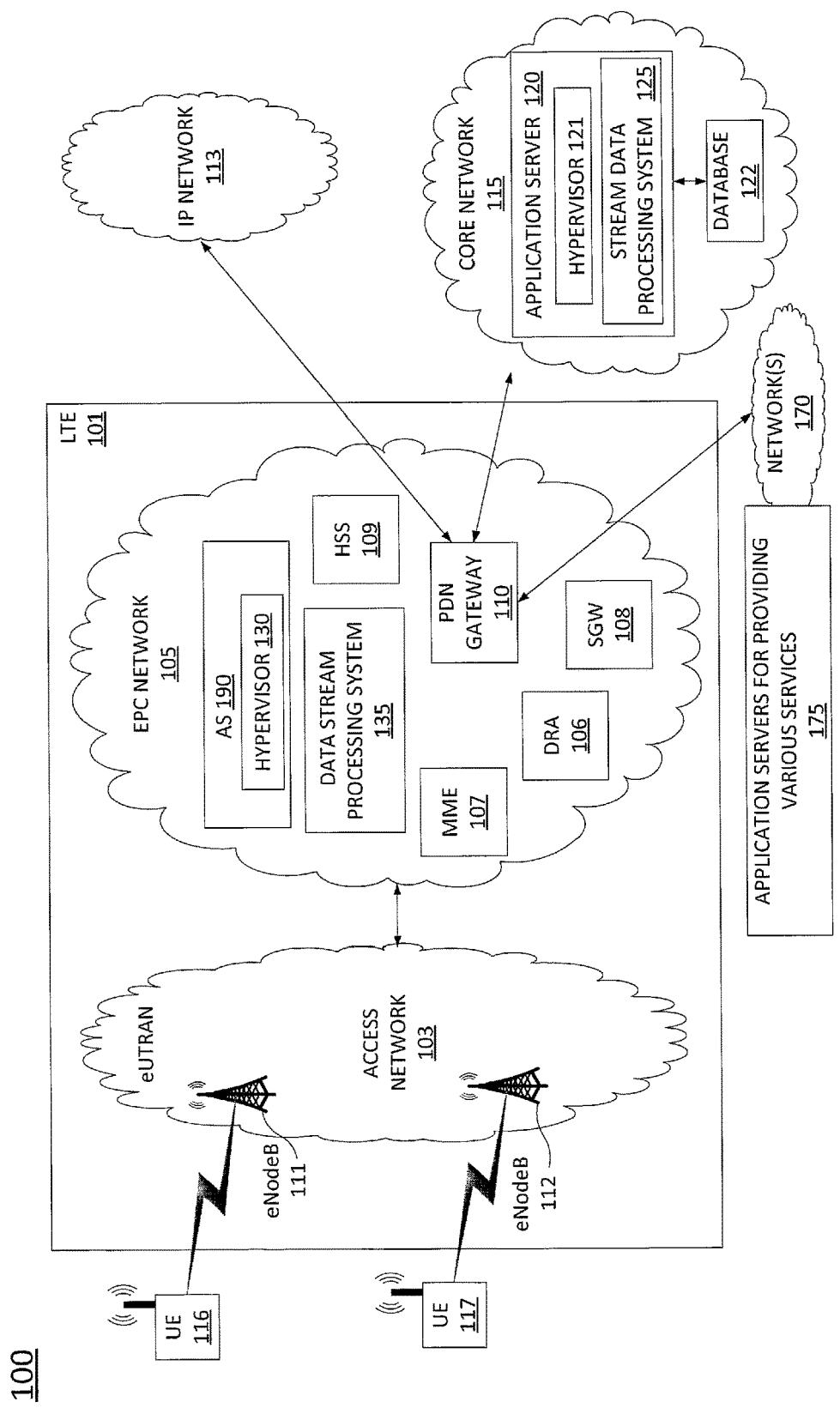
FIG. 1 illustrates an example system related to the present disclosure.

The present disclosure broadly discloses methods, computer-readable media and apparatuses for processing a stream of records with a guarantee that each record is accounted for exactly once. As discussed above, although dropping some records or "over accounting" the same records multiple times may be acceptable for some applications, other applications will require a guarantee that each and every record is accounted for and processed only once.

For example, in certain applications it is very important that each and every record is only processed and counted only once in order to ensure that the results from the real time analysis are truly accurate. In one embodiment of the present disclosure, a streaming processing system is able to provide "exactly once streaming," i.e., there is a guarantee that every record that enters the stream processing system is accounted for only once. Additionally, the streaming processing system of the present disclosure is able to achieve "exactly once streaming," without processing each record as an ACID (Atomicity, Consistency, Isolation, Durability) transaction which is a logging approach that involves the use of a very high-overhead procedure. In contrast, the stream processing system of the present disclosure uses "replication" to ensure reliability.

To illustrate, it is challenging for a network service provider to ensure that customers are satisfied with a given service on an on-going basis due to ever changing conditions. For example, a network service provider may provide a cellular service, but changing conditions may occur, e.g., a network component may fail, a new bandwidth requirement may impact the overall quality of service, and the like. To address this challenge, the network service provider may implement the given service via a software defined network (SDN) architecture, which is capable of reacting to changing conditions. A software defined network is an approach to networking that allows network administrators to manage network services through abstraction of lower-level functionality. For example, the SDN architectures decouple network control and forwarding functions, thereby enabling network control to become directly programmable and the underlying infrastructure to be abstracted from applications and network services. In other words, the SDN technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, firewalls and the like, may be dynamically instantiated from a common resource pool. Thus, a software defined network architecture may enable a network (e.g., an access network, a core network, and the like) to scale up or down in the face of changing traffic demands by adding and removing virtual network functions (VNFs), e.g., virtual machines.

Consider a closed-loop network control application. A Virtual Network Function (VNF) is implemented on one or more Virtual Machines (VMs) in a cloud computing center. More specifically, suppose that the VNF implements a network firewall, providing network security to a customer site. A benefit of using a cloud infrastructure to implement VNFs is that the processing power of a VNF can be dynamically adjusted by adding VMs to the collection which performs network functions, e.g., firewall processing when demand increases, or removing VMs when demand decreases.

Managing the virtual network infrastructure requires a complex data stream management system or data stream processing system. Each VNF instance produces a stream of records which indicate its health and processing load. These health and processing load indicators typically comprise multiple measurements collected from different components. For example, the VNF instance might produce a stream of records indicating the number of messages it processed and the number of faults it encountered per second. For example, the hypervisor (e.g., an SDN controller) which manages the VM might produce a stream of records indicating CPU and memory usage over the last second. Thus, given the dynamic nature of the SDN infrastructure, it is important that measurements collected from different components are properly accounted for so that VNF instances can be dynamically instantiated or tore down based on the need of the network traffic. If the measurements collected from different components are not properly accounted for, the SDN infrastructure may not respond properly given that the underlying data that it relies on may not be accurate. Thus, processing a stream of records with a guarantee that each record is accounted for exactly once is important in certain applications such as the management of an SDN infrastructure.

In accordance with the present disclosure, a method and apparatus for processing a stream of records with a guarantee that each record is accounted for exactly once are disclosed. In one embodiment, the present approach ensures reliability by using replication, i.e., employing replicas in the operators for performing duplicate processing. While duplicate processing is performed, and records must be transported multiple times, the duplicate processing is much simpler and faster than the logging approach as discussed above, and does not generate a large number of log records. More specifically, traditional data processing approaches do not account for the failure of a data source, the exit of a data source, the entry of a new data source, or the failure of a shard of an operator. These events are often the cause for dropped records or the over accounting of records. In data reduction applications, most operators retain their state for only a short duration. Therefore, a failed shard can be recovered by having the shard subscribes to the input stream, and becoming fully recovered when it has ingested enough of the input stream to replace any partial state. For example, a shard implementing a 5-minute aggregate operator becomes recovered at most 5 minutes after the shard starts operation. These and other aspects of the present disclosure are discussed in greater detail below in connection with the examples of FIGS. 1-5.

To better understand the present disclosure, FIG. 1 illustrates an example network, or system 100 in which embodiments of the present disclosure for processing a stream of records with a guarantee that each record is accounted for exactly once. In one example, the system 100 comprises a Long Term Evolution (LTE) network 101, an IP network 113, and a core network, e.g., an IP Multimedia Subsystem (IMS) core network 115. In one example, system 100 is provided and operated by a cellular/wireless network operator. FIG. 1 also illustrates various mobile endpoint devices 116 and 117, e.g., LTE user equipment or user endpoints (UE). The mobile endpoint devices UE 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the LTE network 101 comprises an access network 103 and a core network, Evolved Packet Core (EPC) network 105. In one example, the access network 103 comprises an evolved Universal Terrestrial Radio Access Network (eUTRAN). The eUTRANs are the air interfaces of the $3^{rd}$ Generation Partnership Project (3GPP) LTE specifications for mobile networks. In one example, EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, mobile endpoint device 116 may access wireless services via the eNodeB 111 and mobile endpoint device 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices such as Mobility Management Entity (MME) 107 and Serving Gateway (SGW) 108 support various functions as part of the LTE network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW. In addition, the EPC network 105 may include a Diameter routing agent (DRA) 106, which may be engaged in the proper routing of messages between other elements within EPC network 105, and with other components of the system 100, such as a call session control function (CSCF) (not shown) in IMS core network 115.

In accordance with the present disclosure, any one or more of the components of EPC network 105 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), or any other network components in any of the networks 170 that provide any other services outside of cellular service can be virtualized (e.g., a virtual router, a virtual switch, a virtual feature server, a virtual firewall, a virtual database server, a virtual media server, and the like) and so forth. For instance, MME 107 may comprise a vMME, SGW 108 may comprise a vSGW, and so forth. In this regard, the EPC network 105 may be expanded (or contracted) to include more or less components than the state of EPC network 105 that is illustrated in FIG. 1. For instance, EPC network 105 may be expanded to include additional PDN gateways, e.g., in the form of vPGWs, additional serving gateways (SGWs), e.g., in the form of vSGWs, and so forth. In one example, the SDN host devices may be deployed in one or more geographically diverse data centers. Accordingly, in one example, the network may be segregated into a number of zones, where different VNFs may be deployed in different zones depending upon the respective locations of the one or more data centers.

In one example, the EPC network 105 may also include an application server (AS) 190. In one embodiment, AS 190 may comprise a computing system, such as computing system 500 depicted in FIG. 5, and may be configured to provide one or more functions for processing a stream of records with a guarantee that each record is accounted for exactly once, and for performing various other operations in accordance with the present disclosure. For example, AS 190 may be configured to perform functions such as those described below in connection with the example method 400 of FIG. 4. Accordingly, the AS 190 may be connected directly or indirectly to any one or more network elements of EPC network 105, and of the system 100 in general, that are configured to gather and forward network analytic information, such as signaling and traffic data, alarm data, and other information and statistics to AS 190 and to receive instructions from AS 190.

In one example, AS 190 may comprise an SDN controller (or hypervisor) 130 that is responsible for instantiating, configuring, managing, and releasing VNFs. For example, in a SDN architecture, an SDN controller may instantiate virtual network functions (VNFs) on shared hardware, which may be referred to as network function virtualization infrastructure (NFVI), host devices, or SDN nodes, and which may be physically located in various places. For example SDN nodes may reside in various data centers distributed in different locations. For example, a router may be instantiated on an SDN node, and released when the router is no longer needed. Similarly, a media server may be instantiated on an SDN node, and released when no longer needed. In one example, the configuring, releasing, and reconfiguring of SDN nodes is controlled by the SDN controller, which may store configuration code, e.g., computer/processor-executable programs, instruction, code, or the like for various functions which can be loaded onto an SDN node. In another example, the SDN controller may instruct, or request an SDN node to retrieve appropriate configuration code from a network-based repository, e.g., a storage device, to relieve the SDN controller from having to store and transfer configuration code for various functions to the SDN nodes. As used herein, the terms "configured" and "reconfigured," and variations thereof, may refer to programming or loading a computing device with computer-readable/computer-executable instructions, code, and/or programs, e.g., in a memory, which when executed by a processor of the computing device, may cause the computing device to perform various functions.

In one example, AS 190 may be deployed in a network operations center (NOC) of a wireless network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between DRA 106, MME 107, SGW 108, eNodeBs 111 and 112, PDN gateway 110, and other components of system 100 are also omitted for clarity.

In one example, AS 190 may be configured to interact with data stream processing system 135. As discussed above, managing the virtual network infrastructure requires a complex data stream processing system. For example, each VNF instance produces a stream of records which indicate its health and processing load. These health and processing load indicators typically comprise multiple measurements collected from different components. For example, the VNF instance might produce a stream of records indicating the number of messages it processed and the number of faults it encountered per second. For example, the hypervisor 130 (e.g., an SDN controller or a virtual machine manager) which manages a VM that may produce a stream of records indicating CPU and memory usage over a period of time, e.g., the last second. As such, the data sources feeding data streams to the data stream processing system 135 may comprise a plurality of VNF instances in the EPC network and a subscriber to an output stream of the data stream processing system 135 may be the hypervisor 130 or any other consuming applications that need the output stream. The use of term "subscriber" or "consumer" encompasses a consuming application or any network function that needs the output stream from the data stream processing system 135. Similarly, core network, e.g., an IMS network, may also employ an SDN infrastructure for various network components (not shown) deployed in the core network 115. As such, core network 115 may also employ a hypervisor 121 and a data stream processing system 125 for managing the VNF instances of the core network 115 with a database 122 for storing any number of records or pertinent data that is needed. In fact, similar arrangements can also be found in networks 170 and IP network 113, where a respective hypervisor, a respective data stream processing system, and one or more respective VNF instances can be deployed in the respective network. The one or more VNF instances will correspond to the underlying services provided by the networks. For brevity, any network functions in these networks can be implemented on one or more VMs supporting one or more VNF instances.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, and/or other network components may be deployed in an IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for deploying virtual network functions in response to detecting an emergency event. Thus, these and other modifications are all contemplated within the scope of the present disclosure.

Figure 2:
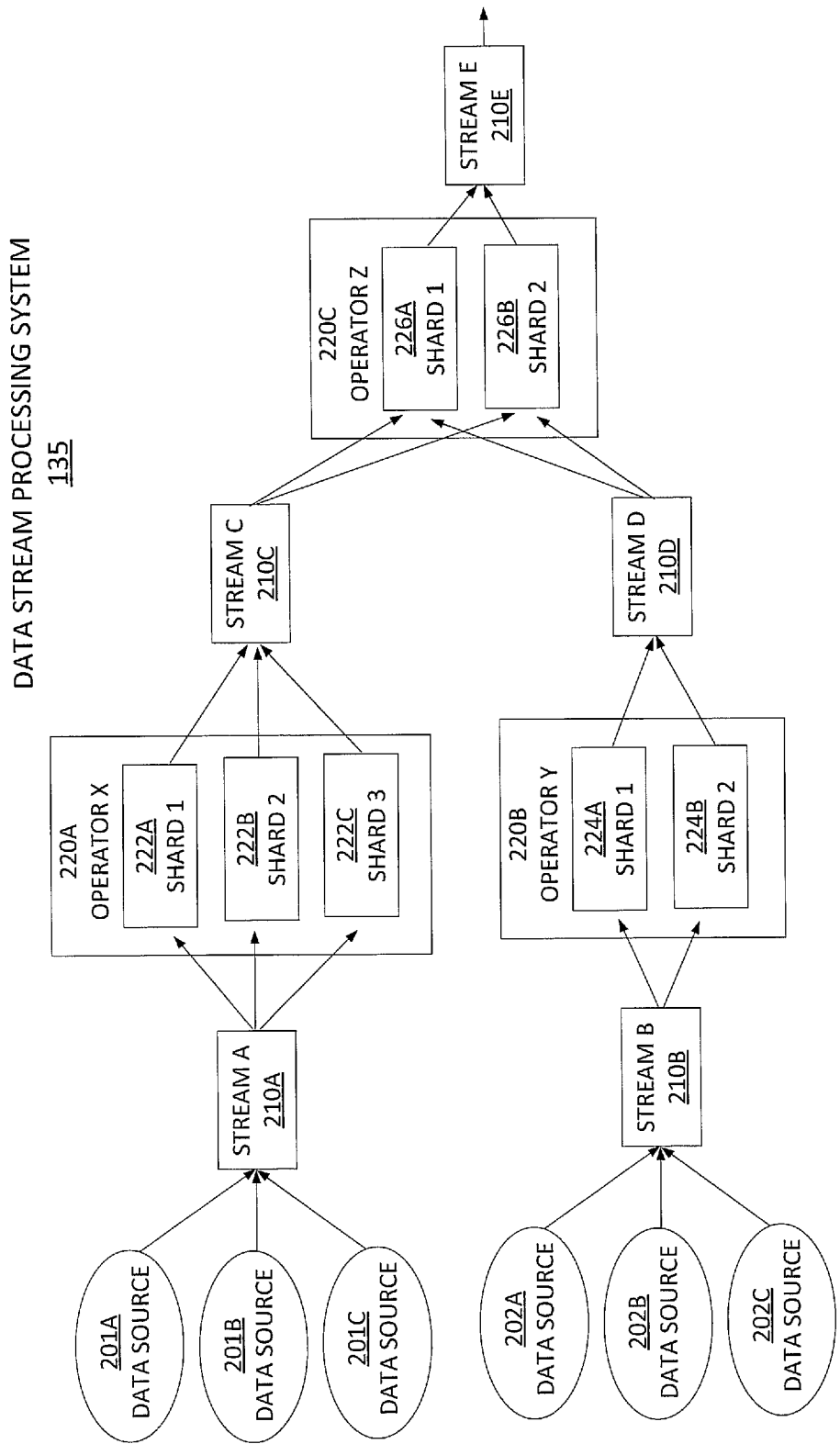
FIG. 2 illustrates an example of a data stream processing system.

FIG. 2 illustrates an example data stream processing system 135 with greater details. The data stream processing system 135 comprises one or more operators (e.g., 220A, 220B, and 220C) receiving a data stream (e.g., 210A, 201B) provided by a plurality of data sources. Each operator in turn provides an output stream (e.g., 210C, 210D, 201E) that is provided to another operator or a subscriber, e.g., a hypervisor that is interested in the output stream.

To illustrate, a collection of data sources (201A, 201B, 201C, 202A, 202B, and 202C) provide the input to data stream A (210A) and stream B (210B). In one embodiment, a data source is an external entity that generates records, and a data stream is a grouping of records with similar properties. A stream can be thought of as the transport mechanism which moves records from one processing node to the next. In one embodiment, the logical program which consumes one or more streams and produces some output in return is referred to as an "operator" (e.g., operator X 220A, operator Y 220B, and operator Z 220C). In the example, stream A is processed by operator X, which is implemented using three shards. Each shard is a processing node which implements an operator and receives a portion of the input stream. In this example, operator X 220A executes on three shards 222A, 222B, and 222C, while operator Y 220B and operator Z 220C execute on two shards 224A-224B, 226A-226B, respectively.

It should be noted that the operator may encompass any operations in accordance with the deployment requirements of an application. For example, the operators may encompass the following list of operator types:

1. Selections, data transformations;
2. Highly time-localized joins and aggregations;
3. Joins against externally-generated temporal reference tables;
4. Joins against internally-generated reference tables (e.g. analyze the RADIUS protocol to get ipv4-to-customer_id mappings);
5. Long-lived analytical state: running aggregates, regular-expression style event detection; and
6. Per-entity slates (e.g. on-line customer tracking)—externally accessible.

These are only illustrative operator types and should not be interpreted as a limitation of the present disclosure.

The data streams can be implemented using a distributed queueing mechanism. These queues generally move records from multiple sources to multiple destinations while providing various levels of reliability guarantees. For example, the message queue might guarantee that if a record is inserted in the queue, it is correctly distributed to all intended recipients, as long as no failures occur.

Message queueing systems such as Apache Kafka might provide stronger guarantees, such as message ordering and reliable replay of old messages. A message queueing system might have provisions for proper routing of messages. This routing might depend on properties of the messages, e.g., using a hash of a key field. A message might be routed to multiple shards, e.g., the routing policy might be "replicate all." Different systems may have different types of stream definitions. For example, Java-based systems may combine a record definition (i.e., schema) with a stream. For example, all records in a data stream have the same schema, whereas two different streams may have different schemas. A stream is a transport from one operator to another. A stream can also be identified as the output of an operator.

The shared stream system as shown in FIG. 2 that relies on massive distributed parallelism may have mechanisms that allow processing nodes to enter and leave the system. For example, the server running shard 2 222B of operator X 220A may fail. The failure may result in a change in configuration, e.g., stream A must be informed of the change in configuration and distribute its records to shard 1 222A and shard 3 222C only. If the load for operator X 220A is too high for only two shards to handle, and additional processing node, say shard 4, can be started and added to the configuration. Configuration management can be done through a distributed database such as Apache Zookeeper. In one embodiment, the sharded system of the present disclosure may provide a graceful method for adding and deleting processing nodes that serves to provide the basic mechanism for load balancing and dynamic allocation of processing resources. For example, lightly loaded operators give up processing nodes, while heavily loaded operators receive additional processing nodes.

Including or excluding shards requires a careful coordination of stream configuration and state management to provide processing guarantees. The problem with a lack of processing guarantees may be summarized in two scenarios: "at most once" and "at least once" during failure situations. In "at most once" processing guarantee, a record provided by the data source will not be processed twice. In practice, this guarantee means that there is no reliability mechanism at all in the system. If a processing node in a stream message queue fails, or if a shard fails, no attempt is made to recover their state. Thus, records may be lost. In "at least once" processing guarantee, a record provided by the data source will be processed at least once, and possibly multiple times. This guarantee is implemented by having the data sources persist the input records until they are "fully processed." If a record contributes to multiple other records, then the record must be fully processed and all associated records must also be processed. Thus, during a failure some records may be "over accounted," i.e., the same record may be accounted for multiple times. In order to address these two scenarios, some systems employ extensive logging and exchanges of confirmation messages between the data sources and the coordinator of the data stream processing system. Although effective in terms of providing the necessary processing guarantees, such "heavyweight" approaches do not scale well to scenarios where the stream may comprise millions to tens of millions of records per second.

In one embodiment of the present disclosure, the data stream processing system 135 is able to process a stream of records with a guarantee that each record is accounted for "exactly once." As discussed above, the SDN infrastructure will benefit from a data stream processing system that is able to provide an accurate accounting of processed records to assist a hypervisor in the management of the SDN. However, it should be noted that many other applications outside of network management may also benefit from a process that guarantees that each record is accounted for "exactly once." For example, web applications related to advertising may want such strong guarantees, e.g., for an application that assesses a charge for every displayed advertisement, while assuring clients that they are not being over charged due to over-counting errors. In another example, a trend detecting method may parse text messages or tweets to counts words for detecting what topics are trending and so on.

Figure 3:
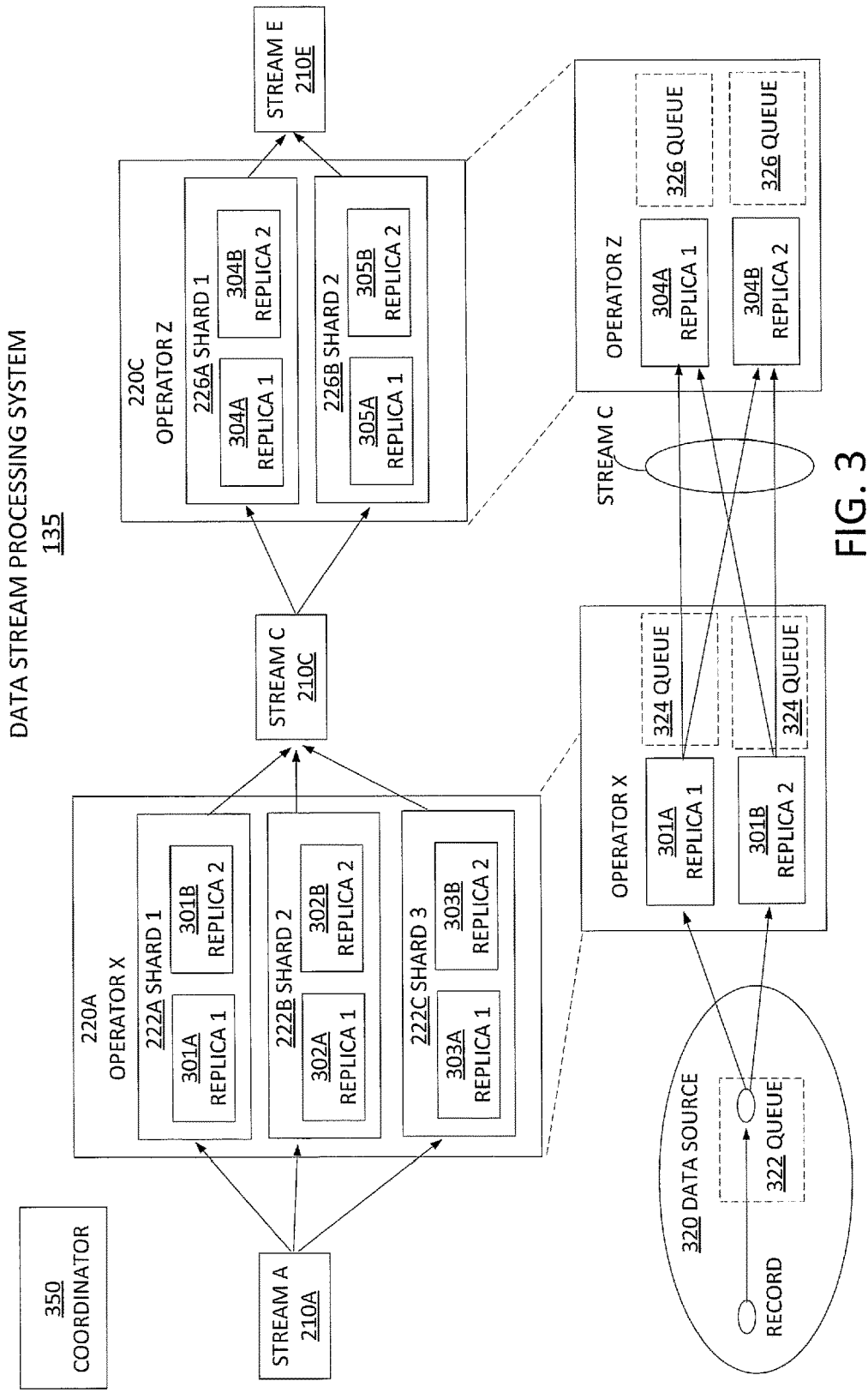
FIG. 3 illustrates an example of another data stream processing system related to the present disclosure.

FIG. 3 illustrates an alternate example data stream processing system 135 with greater details. The data stream processing system 135 of FIG. 3 is similar to the data stream processing system 135 of FIG. 2, but is simplified to just show the interaction of operator X 220A and operator Z 220C to show modifications made to the operators. It should be noted that these modifications can be carried to each of the operators as shown in FIG. 2. Furthermore, the data stream processing system 135 is shown with a coordinator 350, e.g., a controller, that is used to coordinate the various functions of the data stream processing system 135, e.g., shard generation and removal, replica generation and removal, data source registration and de-registration, consuming application or subscriber registration and de-registration, resilient queue management, failure detection and the like. The functions performed by the coordinator will depend on the requirements of a particular implementation of the data stream processing system 135.

Returning to FIG. 3, unlike the operators in FIG. 2, each of the shard in each operator is implemented with two replicas, e.g., 301A-301B, 302A-302B, 303A-303B, 304A-304B, 305A-305B. For example, operator X and operator Z each runs two copies of each shard. The replicas generally execute independently. If replica 1 301A of shard 1 222A fails, a subscribing node, e.g., the hypervisor or another operator 220C, can switch to ingesting records from replica 2 301B of shard 1 222A. Similarly, if replica 1 302A of shard 2 222B fails, a subscribing node, e.g., the hypervisor or another operator 220C, can switch to ingesting records from replica 2 302B of shard 2 222B. Similarly, if replica 1 303A of shard 3 222C fails, a subscribing node, e.g., the hypervisor or another operator 220C, can switch to ingesting records from replica 2 303B of shard 3 222C and similarly for the shards of operator Z 220C as well. It should be noted that an operator or a subscriber is only ingesting or consuming records from one of the replicas, but not from both replicas at any given time. Thus, although each record is technically processed twice via two replicas, each record is only accounted for once.

Furthermore, FIG. 3 illustrates a further simplification where multiple shards are not employed in each of the operators. Then each of the operators X and Z will simply have a pair of replicas. As shown, each replica in the operator will forward a separate stream to each of the replicas in the next operator. As such, the stream 210C shown in FIG. 3 as a single stream contains a plurality of channels of streams. This embodiment effectively allows the "next" operator or a subscriber node to selectively use different channels of data within stream 210C. Thus, if one of the replica in an operator fails, then the "next" operator or a subscriber node may seamlessly select a different channel from the stream 210C.

Thus, the present disclosure provides a data stream processing system that processes a stream of records with a guarantee that each record is accounted for exactly once using replication. The present system is able to provide clean semantics that allows for code generation from high-level languages and query system optimization. Furthermore, the present system provides elastic scaling while also allowing for a great deal of flexibility for new data sources to be added or snapped into a stream (if their schemas match), and new applications can be quickly added to an existing stream system by having the application subscribe to the proper stream message queues.

In one embodiment, a messaging layer to transport records from data sources, through all operators, and to the subscribing applications is provided. For example, the message queues should support certain properties (e.g., reliable property, persistent property, and resilient property) to ensure that a method for processing a stream of records with a guarantee that each record is accounted for exactly once will work.

To illustrate, a message queue is "reliable" if each component ensures that a message is delivered to all consumers or subscribers that subscribe to that component, as long as the component has not failed. A message queue is "persistent" if it stores messages for a period of time, e.g., X seconds, after receiving them. A message queue is "resilient" if it ensures that all messages are delivered to all consumers or subscribers. In one example, a message queue may have several processes located across several servers. A particular server in the message queue may be responsible for delivering its messages to a set of consumers C. The reliable property indicates that the message queue server retries message delivery until it receives an acknowledgement from each consumer c in C. The persistence property indicates that messages are stored for a period of time. For example, a persistent message queue may be a component that is used to build a resilient message queue. Also, a persistent message queue can be a service that is provided to consuming applications. Finally, the resilience property ensures that all messages are pushed through the exactly-once processing system and to the consuming applications. In one example, there is an interaction between the operation of the resilient message queue and the recovery model of the consuming application.

In a first example as shown in FIG. 3, it is assumed that the replica recovery mechanism for operator X (e.g., illustrated as the lower example operator X without shards) is that it receives all messages from the data source starting at some point after it joins the operator execution. Then the reliable queue 322 deployed at the data source 320 needs to ensure that all messages are delivered to all working replicas e.g., 301A and 301B. In one embodiment, the reliability mechanism is simply to maintain separate message delivery queues for each replica and using a reliable transport protocol such as Transmission Control Protocol (TCP).

However, if the data source 320 fails, then the data source's reliable queue 322 may have delivered message m to replica 1 301A but not to replica 2 301B. There are several ways to handle this issue and ensure resilient delivery. In a first example, the method may execute a distributed commit protocol to ensure that both replicas, e.g., 301A and 301B, receive the same set of message. For example, the method may use a running two-phase commit protocol to deliver messages. The replicas, e.g., 301A and 301B, continually acknowledge the messages they receive. When the reliable queue 322 executing at the data source receives acknowledgements from all replicas, it sends a release message to the replicas. In one embodiment, if the data source fails, the replicas may coordinate to determine the maximum set of released messages. In a second example, the method may use an external component outside of the data source that implements a resilient queue instead, such as Apache Kafka or Apache Samza.

In another example, suppose that there are two replicas of operator X and two of operator Z as shown in FIG. 3, and that operator Z recovers a new replica by having it connect to the output of operator X and receiving all new messages. Then a resilient queue 324 can be implemented by building a reliable queue at the replicas of operator X and have them deliver to both replicas of operator Z. De-duplication is required, but the system is resilient to the failure of any single replica.

In yet another example, a consuming application that consumes messages from operator Z may need to receive every output message, but it does not have any native support for resiliency. Suppose that operator Z maintains persistent output queues 326. If the consuming application fails, upon restart, the consuming application may contact the operator Z and load any missing messages.

In one embodiment of the present disclosure, the data stream processing system employs shards in the operators. However, this configuration is not a requirement of the present disclosure and may depend on the requirements of a particular implementation. In one embodiment, shard replicas are used for resilience as shown in FIG. 3 above. Each replica executes its portion of its shard of the operator. In one example, each replica is an independent peer. However in an alternate embodiment, the data stream processing system may implement a master-spare relationship between the replicas, e.g., a master replica and a hot spare replica, and the master replica streams important state to the one or more spare replicas, e.g., the order in which to process messages. This global ordering may help to ensure deterministic processing and output record ordering, but the use of the master-spare relationship is an option and not a requirement of the present disclosure.

In one embodiment, if a replica fails, then consuming applications or a subscriber may recover from the failure by subscribing to a remaining live replica. Under the assumption of determinism, all replicas of an operator will produce the same output. The resilient message queue will ensure that the subscriber recovery occurs with no lost or duplicate records. Therefore, if there is no failure (and no reshuffling of shard responsibility), then the replicas do not need to communicate.

In one example, if one of the replicas fails, then it may be necessary to bring up a replacement replica rapidly. The support for replica replacement in turn depends on the nature of the state maintained by the operator.

In one embodiment, operators may have no state. In other words, some operators may store no state at all, and instead perform selections and transformations on their input stream. For example, a stateless operator may perform regular-expression feature extraction and pass on matching records with their extracted features. An operator with no state can be recovered by simply connecting the replacement replica of the operator to the input stream and resuming processing.

In another embodiment, operators may have short-lived state. In other words, some operators in a data reduction stream processing system may keep a significant amount of state, but only for a limited time period. For example, the operator may compute 5-minute aggregates, or the operator may perform a band join between two source streams with an e.g., 1-minute band range. These operators can be recovered by connecting them to their source stream(s) and waiting until the operators have recovered any required states.

In another embodiment, operators may have external data. In other words, some operators may perform joins against relatively static data loaded from an external source. For example, packet classification via IPV4 address longest prefix matching. This type of operator must load the external table and start participating in the table's refresh protocol before resuming processing. In normal processing, this table must be occasionally refreshed. One example procedure for installing a new table is to transfer the table to each replica, and when the transfer is confirmed, schedule the replicas to use the new table for records with a timestamp e.g., 10 seconds in the future or larger.

In another embodiment, operators may have long-lived state. In other words, some operators may make use of long-lived state via a table. For example, some operators may make use a join against a temporal description table that is derived from a data stream. For example, a mapping of (ip address→customer ID) derived from monitoring, e.g., the radius protocol.

The approach for replica replacement for long-lived state is as follows. First, freeze the state of the table at a particular replica at a particular time "Tf." Records with timestamp larger than Tf are buffered. When a "punctuation" record arrives indicating that all records with timestamp<=Tf have arrived and been processed, make a copy of the table. For example, one option for making a copy of the table is to fork the process. Second, once the copy is made, transfer the state to the replica. Third, after the replica receives the state, it rewinds the input stream to access all records with timestamp>Tf, and executes them on the received state. Alternatively, the replica can start by subscribing to the stream, and then buffering records with timestamp>Tf until the state arrives. Finally, the state transfer can occur incrementally by dividing the state into R ranges and transferring each in turn. Incremental transfer might be useful if the state is large and transferring it would be disruptive.

Figure 4:
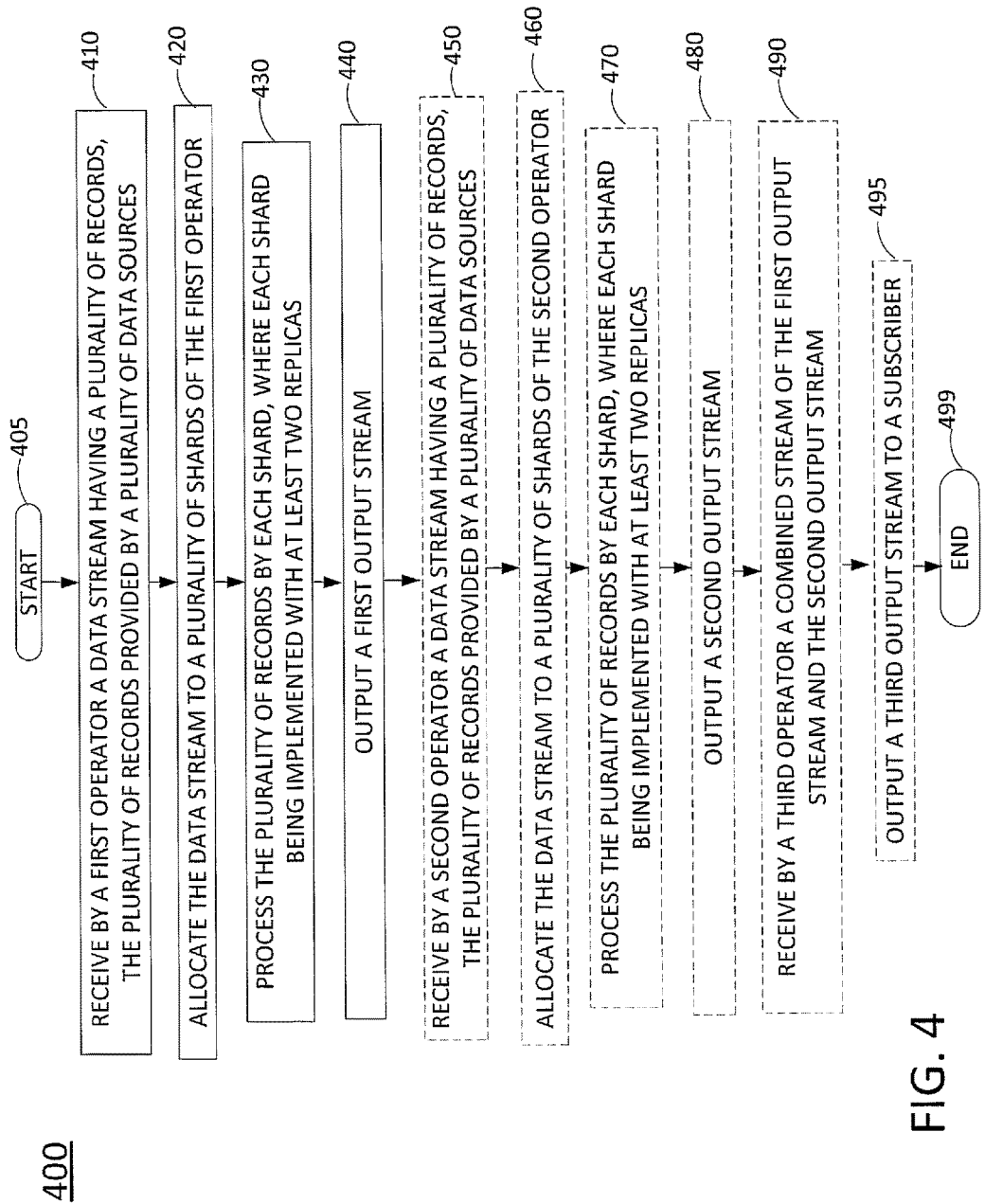
FIG. 4 illustrates a flowchart of an example method for processing a stream of records with a guarantee that each record is accounted for exactly once.

FIG. 4 illustrates a flowchart of an example method 400 for processing a stream of records with a guarantee that each record is accounted for exactly once. In one embodiment, the steps, operations or functions of the method 400 may be performed by any one or more of the components of the system 100 depicted in FIG. 1. For example, in one embodiment, the method 400 is performed by the application server (AS) 190. In another embodiment, the method 400 is performed by AS 190 in coordination with other components of the system 100. In another example, the method 400 is performed by hypervisor 250 of FIG. 1, or by data stream processing system 135 or coordinator 350 in coordination with other components of the system 100. Alternatively, or in addition, one or more steps, operations or functions of the method 400 may be implemented by a computing device having a processor, a memory and input/output devices as illustrated below in FIG. 5, specifically programmed to perform the steps, functions and/or operations of the method. Although any one of the elements in system 100 of FIG. 1 may be configured to perform various steps, operations or functions of the method 400, the method will now be described in terms of an embodiment where steps of the method are performed by a processor, such as processor 502 in FIG. 5. For example, processor 502 may be deployed in a communication network to perform the method 400.

The method 400 begins in step 405 and proceeds to step 410. In step 410, the processor, receives via a first operator (e.g., operator x) a data stream (e.g., stream A) having a plurality of records, the plurality of records provided by a plurality of data sources (e.g., data sources 201A-201C).

At step 420, the processor allocates the stream to a plurality of shards of the first operator, e.g., shards 222A-222C.

At step 430, the processor processes the plurality of records by each shard, where each shard being implemented with at least two replicas (e.g., 301A-301B; 302A-302B; 303A-303B).

At step 440, the processor outputs a first output stream (e.g., stream C) to another operator or a subscriber or a consuming application.

If the data stream processing system 135 employs a plurality of operators (e.g., a second operator such as operator Y and a third operator such operator Z), then optional steps 450-480 can be executed for a second operator (e.g., operator Y). In optional step 450, the processor, receives via a second operator (e.g., operator Y) a data stream (e.g., stream B) having a plurality of records, the plurality of records provided by a plurality of data sources (e.g., data sources 202A-202C).

At optional step 460, the processor allocates the stream to a plurality of shards of the second operator, e.g., shards 224A-224B.

At optional step 470, the processor processes the plurality of records by each shard, where each shard being implemented with at least two replicas.

At optional step 480, the processor outputs a second output stream (e.g., stream D) to another operator or a subscriber or a consuming application.

In optional step 490, the processor, receives via a third operator (e.g., operator Z) a data stream (e.g., a combined stream of stream C and stream D) having a plurality of records, the plurality of records provided by a plurality of operators (e.g., operators 220A and 220B).

At step 495, the processor outputs a third output stream (e.g., stream E) to another operator or a subscriber or a consuming application. It should be noted that operator Z may perform similar steps (not shown) to those of steps 420-430 or steps 460-470 to generate the third output stream. Method 400 then ends in step 499.

In one embodiment, it should be noted that a subscriber or a consuming application may perform one or more actions based on the received streams. For example, a data stream processing system which manages a firewall VNF in a SDN might operate as follows. A first operator O1 collects messages from the firewall VNFs and transforms them into a standardized record. Operator O2 reads the output of O1 and computes a 30-second sliding window average of the messages-processed and faults indicators, producing one output record per second. A third operator O3 collects messages from all VMs in the computing center and uses an external table which maps VMs to the VNF that they implement to compose a stream of messages related to the VM resource usage (e.g., CPU and memory usage) of the VMs which implement the firewall. The outputs of O1, O2, and O3 are sent to operator O4 which correlates these streams to create a message indicating (messages-processed, faults, CPU-usage, memory-usage) for each VM implementing the firewall VNF, per a predefined time period, e.g., once per second. The output of O4 is sent to operator O5 which collects and maintains a long-lived model of operating state of each VM implementing the firewall VNF. Operator O4 not only maintains this long-lived model of each VM, but it produces alert messages when key performance indicators in the long-lived model cross pre-determined thresholds. The alert messages generated by O4 are sent to an external consumer, e.g., the virtualized network controller (e.g., a hypervisor), which acts on these messages to spin-up new firewall VNF VMs, shut down some firewall VNF VMs, or restart existing firewall NVF VMs and so on. This illustrative example demonstrates that any number of actions can be taken by an autonomous system to implement any number of functions in an SDN infrastructure.

In addition, although not specifically specified, one or more steps, functions, or operations of the method 400 may include a storing, displaying and/or outputting step as required for a particular application. In other words, any data, records, fields, and/or intermediate results discussed in the method 400 can be stored, displayed, and/or outputted either on the device executing the respective method or to another device, as required for a particular application. Furthermore, steps, blocks, functions, or operations in FIG. 4 that recite a determining operation or involve a decision do not necessarily require that both branches of the determining operation be practiced. In other words, one of the branches of the determining operation can be deemed as an optional step. Moreover, steps, blocks, functions, or operations of the above described method 400 can be combined, separated, omitted, and/or performed in a different order from that described above, without departing from the examples of the present disclosure.

Figure 5:
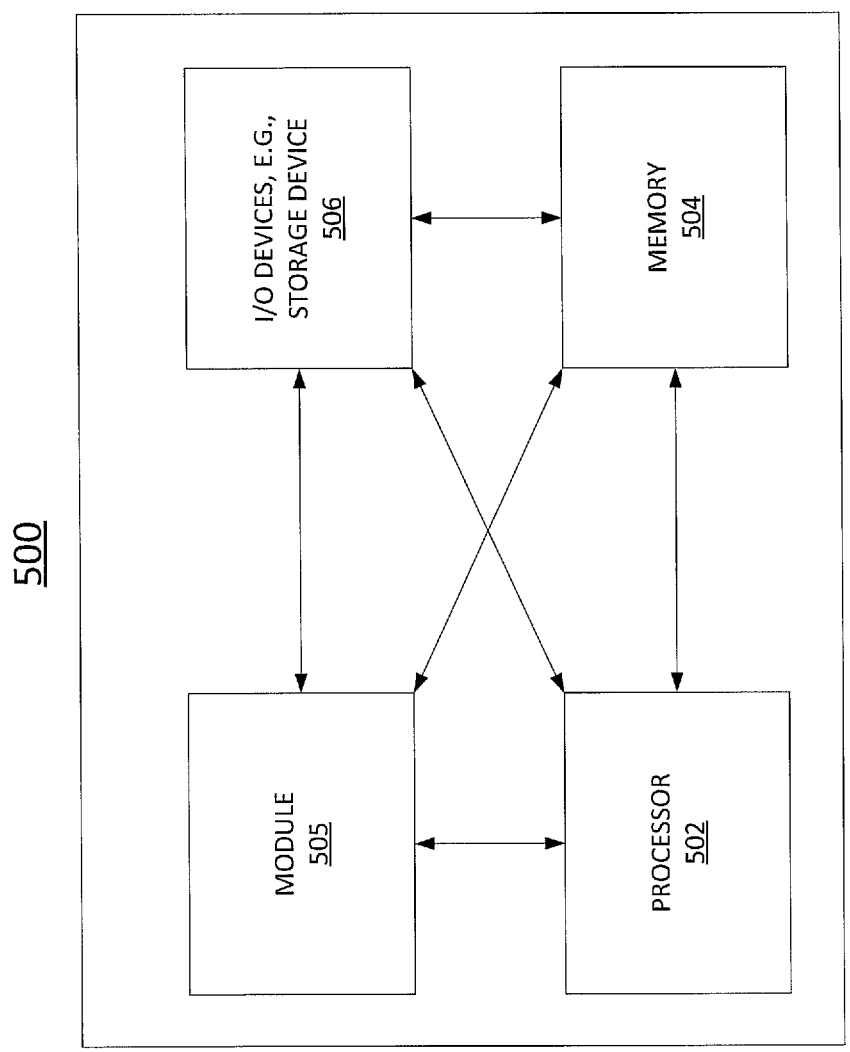
FIG. 5 illustrates a high-level block diagram of a computing device specially configured to perform the functions, methods, operations and algorithms described herein.

FIG. 5 depicts a high-level block diagram of a computing device specifically programmed to perform the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for processing a stream of records with a guarantee that each record is accounted for exactly once, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., certain steps of the above method 400, or the entire method 400 is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400. In one embodiment, instructions and data for the present module or process 505 for processing a stream of records with a guarantee that each record is accounted for exactly once (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for processing a stream of records with a guarantee that each record is accounted for exactly once (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described example embodiments, but should be defined only in accordance with the following claims and their equivalents.

What is claimed is:

1. A device comprising:
a processor of a data stream processing system; and
a computer-readable medium storing instructions which, when executed by the processor, cause the processor to perform operations, the operations comprising:
receiving, via a first operator, a first data stream having a plurality of records, the plurality of records provided by a plurality of first data sources, wherein the plurality of records comprises data associated with at least one virtual network function of a software defined network;
allocating the first data stream to a plurality of shards of the first operator;
processing the plurality of records by the plurality of shards to generate a first output stream, wherein each shard of the plurality of shards processes a respective portion of the plurality of records to generate a respective portion of the first output stream, wherein each shard of the plurality of shards is implemented with at least two replicas, wherein the at least two replicas perform duplicate processing of the respective portion of the plurality of records; and
outputting the first output stream to a third operator or a subscriber.

2. The device of claim 1, wherein the at least one virtual network function comprises at least one of: a virtual router, a virtual switch, a virtual feature server, a virtual firewall, a virtual database server, a virtual media server, a virtual cache, or a virtual middle-box.

3. The device of claim 2, the operations further comprising:
modifying one of the at least one virtual network function;
adding a new virtual network function; or
removing one of the at least one virtual network function.

4. The device of claim 1, wherein the at least one virtual network function comprises at least one of: a virtual mobility management entity, a virtual home subscriber server, a virtual serving gateway, or a virtual packet data network gateway.

5. The device of claim 4, the operations further comprising:
modifying one of the at least one virtual network function;
adding a new virtual network function; or
removing one of the at least one virtual network function.

6. The device of claim 1, the operations further comprising:
receiving, via a second operator, a second data stream having a second plurality of records, the second plurality of records provided by a plurality of second data sources;
allocating the second data stream to a second plurality of shards of the second operator;
processing the second plurality of records by the second plurality of shards to generate a second output stream, wherein each shard of the second plurality of shards processes a respective portion of the second plurality of records to generate a respective portion of the second output stream, wherein each shard of the second plurality of shards is implemented with at least two second replicas, wherein the at least two second replicas perform duplicate processing of the respective portion of the second plurality of records; and
outputting the second output stream to the third operator or the subscriber.

7. The device of claim 1, wherein each first data source of the plurality of first data sources employs a queue.

8. The device of claim 1, wherein each of the at least two replicas employs a queue.

9. A method comprising:
receiving, via a processor of a first data stream processing system implementing a first operator, a data stream having a plurality of records, the plurality of records provided by a plurality of first data sources, wherein the plurality of records comprises data associated with at least one virtual network function of a software defined network;
allocating, via the processor, the first data stream to a plurality of shards of the first operator;
processing, via the processor, the plurality of records by the plurality of shards to generate a first output stream, wherein each shard of the plurality of shards processes a respective portion of the plurality of records to generate a respective portion of the first output stream, wherein each shard is implemented with at least two replicas, wherein the at least two replicas perform duplicate processing of the respective portion of the plurality of records; and
outputting, via the processor, the first output stream to a third operator or a subscriber.

10. The method of claim 9, wherein the at least one virtual network function comprises at least one of: a virtual router, a virtual switch, a virtual feature server, a virtual firewall, a virtual database server, a virtual media server, a virtual cache, or a virtual middle-box.

11. The method of claim 10, further comprising:
modifying one of the at least one virtual network function;
adding a new virtual network function; or
removing one of the at least one virtual network function.

12. The method of claim 9, wherein the at least one virtual network function comprises at least one of: a virtual mobility management entity, a virtual home subscriber server, a virtual serving gateway, or a virtual packet data network gateway.

13. The method of claim 12, further comprising:
modifying one of the at least one virtual network function;
adding a new virtual network function; or
removing one of the at least one virtual network function.

14. The method of claim 9, further comprising:
receiving, via a second operator, a second data stream having a second plurality of records, the second plurality of records provided by a plurality of second data sources;
allocating the second data stream to a second plurality of shards of the second operator;
processing the second plurality of records by the second plurality of shards to generate a second output stream, wherein each shard of the second plurality of shards processes a respective portion of the second plurality of records to generate a respective portion of the second output stream, wherein each shard of the second plurality of shards is implemented with at least two second replicas, wherein the at least two second replicas perform duplicate processing of the respective portion of the second plurality of records; and outputting the second output stream to the third operator or the subscriber.

15. The method of claim 9, wherein each first data source of the plurality of first data sources employs a queue.

16. The method of claim 9, wherein each of the at least two replicas employs a queue.

17. A non-transitory computer-readable medium storing instructions which, when executed by a processor of a data stream processing system, cause the processor to perform operations, the operations comprising:

receiving, via a first operator, a data stream having a plurality of records, the plurality of records provided by a plurality of first data sources, wherein the plurality of records comprises data associated with at least one virtual network function of a software defined network;

allocating the data stream to a plurality of shards of the first operator;

processing the plurality of records by the plurality of shards to generate a first output stream, wherein each shard of the plurality of shards processes a respective portion of the plurality of records to generate a respective portion of the first output stream, wherein each shard is implemented with at least two replicas, wherein the at least two replicas perform duplicate processing of the respective portion of the plurality of records; and outputting the first output stream to a third operator or a subscriber.

18. The non-transitory computer-readable medium of claim 17, wherein the at least one virtual network function comprises at least one of: a virtual router, a virtual switch, a virtual feature server, a virtual firewall, a virtual database server, a virtual media server, a virtual cache, or a virtual middle-box.

19. The non-transitory computer-readable medium of claim 18, the operations further comprising:

modifying one of the at least one virtual network function;

adding a new virtual network function; or removing one of the at least one virtual network function.

20. The non-transitory computer-readable medium of claim 17, wherein the at least one virtual network function comprises at least one of: a virtual mobility management entity, a virtual home subscriber server, a virtual serving gateway, or a virtual packet data network gateway.

* * * * *